United States Patent
Leon (10) Patent No.: US 9,651,356 B1
(45) Date of Patent: May 16, 2017

(54) MEASUREMENTAL EVALUATION OF DIMENSIONAL TOLERANCING COMPLIANCE OF A CYLINDRICAL OBJECT

(71) Applicant: Raymond Steve Leon, Corona, CA (US)

(72) Inventor: Raymond Steve Leon, Corona, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 456 days.

(21) Appl. No.: 14/302,656

(22) Filed: Jun. 12, 2014

Related U.S. Application Data (60) Provisional application No. 61/932,844, filed on Jan. 29, 2014.

(51) Int. Cl.
  *G01R 33/02* (2006.01)
  *G01B 7/14* (2006.01)
  *G01D 5/22* (2006.01)

(52) U.S. Cl.
  CPC ............ *G01B 7/14* (2013.01); *G01D 5/2291* (2013.01)

(58) Field of Classification Search
  CPC .... G01R 33/07; G01R 33/02; G01R 31/2891; G01N 1/12; G01N 27/023; G01N 33/383; G01N 9/02; H01L 21/68
  USPC .. 324/724, 600, 452–453, 500, 514, 754.04, 324/207.15–207.25; 74/89, 89.23, 89.35; 340/870.36
  See application file for complete search history.

(56) References Cited

U.S. PATENT DOCUMENTS

| | | | |
|---|---|---|---|
| 4,918,627 A | 4/1990 | Garcia et al. | |
| 5,208,763 A * | 5/1993 | Hong .................... | G05B 19/402 700/192 |
| 5,586,052 A | 12/1996 | Iannuzzi et al. | |
| 5,687,094 A | 11/1997 | Kagawa et al. | |

(Continued)

OTHER PUBLICATIONS

U.S. Appl. No. 61/932,844, filed Jan. 29, 2014, title "Gage for Measuring Critical Dimension Surfaces of a Rolling Airframe Missile Rocket Motor," inventors Nicholas S. Goldberg, Raymond S. Leon, and Kevin R. Orlowski.

(Continued)

*Primary Examiner* — Melissa Koval
*Assistant Examiner* — Trung Nguyen
(74) *Attorney, Agent, or Firm* — Howard Kaiser (57) ABSTRACT

Exemplary inventive practice provides for evaluation of a substantially cylindrical object in terms of its conformity to dimensional tolerance standards designated for that object, such as involving runout tolerancing or profile tolerancing. Distances to the curved axial-longitudinal surface of the object are measured by sensors (e.g., linear variable differential transformers) at various axial-rotational orientations of the object. A computer converts the sensory measurements (e.g., represented as voltage signals) to linear measurements (e.g., defined in inches or centimeters), compares the linear measurements to pertinent dimensional tolerance standards stored in memory, and renders a "pass-or-fail" decision regarding acceptability of the object. Failure of the object is implied by nonconformity in any respect of its linear measurements to its dimensional tolerance standards.

11 Claims, 7 Drawing Sheets

(56) References Cited

U.S. PATENT DOCUMENTS

| | | | |
|---|---|---|---|
| 5,771,044 | A | 6/1998 | Cragun et al. |
| 5,956,251 | A | 9/1999 | Atkinson et al. |
| 6,822,745 | B2 | 11/2004 | De Groot et al. |
| 6,879,933 | B2 | 4/2005 | Steffey et al. |
| 7,024,263 | B2 | 4/2006 | Drake, Jr. et al. |
| 7,188,429 | B2 * | 3/2007 | Haidler ............... G01B 5/0028 33/542 |
| 7,194,387 | B1 | 3/2007 | Filatov et al. |
| 7,590,497 | B2 | 9/2009 | Tornquist et al. |
| 7,924,435 | B2 | 4/2011 | Colonna De Lega et al. |
| 7,948,636 | B2 | 5/2011 | De Groot et al. |
| 7,952,724 | B2 | 5/2011 | De Lega et al. |
| 8,041,527 | B2 | 10/2011 | Day et al. |
| 8,087,004 | B2 | 12/2011 | Sims, Jr. et al. |
| 8,355,895 | B2 | 1/2013 | Sims, Jr. |
| 8,423,325 | B2 | 4/2013 | Sims, Jr. |
| 8,698,891 | B2 | 4/2014 | Turner et al. |
| 9,335,146 | B1 | 5/2016 | Goldberg et al. |
| 2011/0191057 | A1 | 8/2011 | Sheehan |

OTHER PUBLICATIONS

U.S. Appl. No. 14/603,754, filed Jan. 23, 2015, title "Dimensional Measurement Apparatus for a Cylindrical Object," inventors Nicholas S. Goldberg, Raymond S. Leon, and Kevin R. Orlowski.

\* cited by examiner

MEASUREMENTAL EVALUATION OF DIMENSIONAL TOLERANCING COMPLIANCE OF A CYLINDRICAL OBJECT

BACKGROUND OF THE INVENTION

The present invention relates to dimensional measurement of objects, more particularly to dimensional measurement of cylindrical objects for purposes of evaluating compliance of the cylindrical objects with engineering tolerances.

Dimensional measurement of cylindrical objects is often difficult and inaccurate. Standard measuring instrumentation (SMI) and coordinate measurement machine (CMM) inspection techniques are widely used to determine whether a part passes or fails precision design criteria. Conventional methods for measuring dimensions of cylindrical objects tend to be time-consuming and inconsistent, particularly because of stringent requirements of radial inspection.

One conventional approach to measuring the geometric dimensioning and tolerancing (GD&T) requirements of a cylindrical tube (CT) involves implementation of any of various open setups using standard measuring equipment. Measurement of dimensions of components can take, for instance, three hours or more to perform.

Another conventional approach to measuring the GD&T requirements of a CT makes use of a coordinate measuring machine (CMM). This conventional method is time-consuming as well, and requires a highly skilled operator to ensure proper interpretation of the component drawing when writing the CMM inspection program. In addition, a CMM is limited insofar as it cannot properly measure the outer diameter on a long CT, since a typical CMM requires the CT to be moved during the middle of the inspection process.

SUMMARY OF THE INVENTION

The present invention, as frequently embodied, represents a better methodology for evaluating compliance of an object with one or more engineering tolerancing standards pertaining to that object. For instance, inventive practice can verify critical interfaces of a cylindrical object, including but not limited to surface profile, axial perpendicularity, and true positions of holes and tabs.

Exemplary practice of the present invention evaluates compliance of an object with dimensional tolerancing. Inventive practice may concern, for instance, dimensional runout tolerancing and/or dimensional profile tolerancing. The object being evaluated has a cylindrical surface and an axis of rotation. Distance measurements are taken by at least one sensor (e.g., linear variable differential transformer) with respect to the object at plural different rotational positions of the object. Each sensor senses the distance from the sensor to the cylindrical surface of the object.

In accordance with computer program logic, a computer inputs the sensory measurement data (e.g., voltage values), converts the sensory measurement data to linear measurement values, prescribes at least one dimensional tolerance standard, and decides whether the object either (i) passes dimensional tolerancing or (ii) fails dimensional tolerancing. The pass-versus-fail decision involves comparison of the linear measurement values (obtained from the sensory measurement data) with the prescribed dimensional tolerance standard(s). The object is deemed to pass dimensional tolerancing if the object completely conforms to the prescribed dimensional tolerance standard(s). The object is deemed to fail dimensional tolerancing if the object does not completely conform to the prescribed dimensional tolerance standard(s).

The terms "tolerancing" and "engineering tolerancing" are used interchangeably herein to broadly refer to one or more acceptable limits of an object as prescribed by engineering design or engineering intent of the object. The tolerancing relates to one or more physical properties (size, shape, dimensions, distance, spacing, configuration, etc.) of the object, or of one or more parts or components of the object.

The semi-automated inspection performed by exemplary inventive practice reduces inspection time and increases repeatability. A prototype inventive apparatus, including a computer and CT gage hardware, has demonstrated the ability to fully inspect a single CT in less than twenty minutes, which is considerably faster than the conventional open-setup method or the conventional CMM method. Moreover, exemplary inventive practice achieves consistent results. The aforementioned inventive prototype, used in association with a CT, has demonstrated a repeatability of 0.0002 inches, which exceeds ten times the accuracy of any dimension being inspected for a cylindrical tube.

Furthermore, an exemplary inventive device is easy to use, and obviates the need for high cost labor. Even a person who is not highly skilled in operating measurement instruments may require little (e.g., less than one hour) or no training to practice the present invention. For instance, an inventive computer program product can be embodied to provide on-screen step-by-step instructions to the user as he/she proceeds through the inspection process.

The present invention can be practiced to measure a variety of cylindrical objects and to verify their dimensional conformance to drawing requirements in a variety of applications, including but not limited to applications involving cylindrical parts of rockets or missiles such as rocket tubes or missile tubes. Usual inventive practice implements a computer and a computer display to facilitate inventive measurement. The computer includes a processor and memory/storage, both volatile and non-volatile. An inventive algorithm may be coded in practically any computer programming language. The present invention can be embodied, for instance, as a method (e.g., a computer-implemented method), a system or apparatus including a computer, or a computer program product.

BRIEF DESCRIPTION OF THE DRAWINGS

The present invention will now be described, by way of example, with reference to the accompanying drawings, wherein:

FIGS. 2 through 6 are a block diagram of exemplary practice, in accordance with the present invention, of dimensional measurement of a cylindrical object.

DESCRIPTION OF EXEMPLARY EMBODIMENTS OF THE INVENTION

Figure 1:
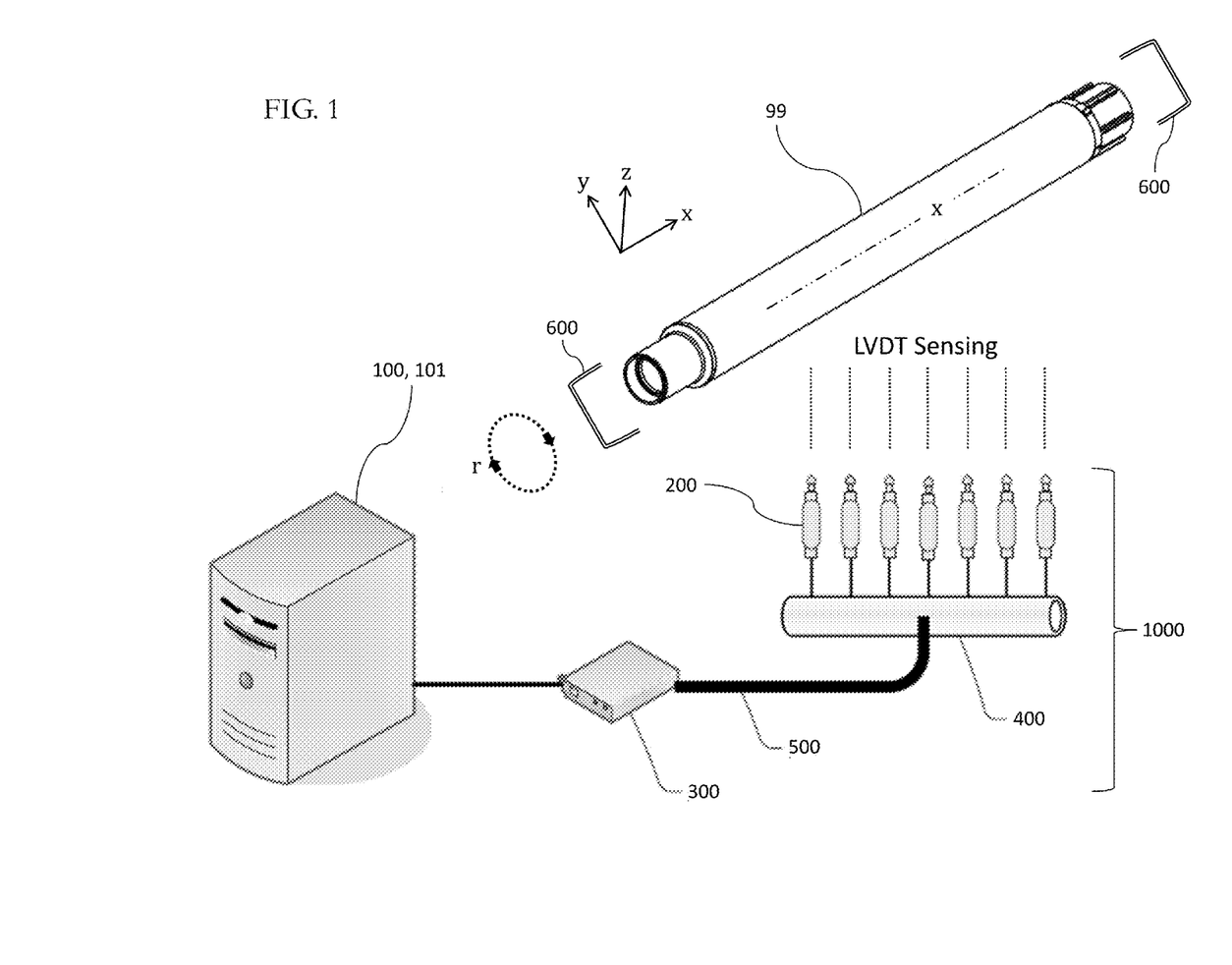
FIG. 1 is a schematic of exemplary practice, in accordance with the present invention, of dimensional measurement of a cylindrical object.
Figure 2:
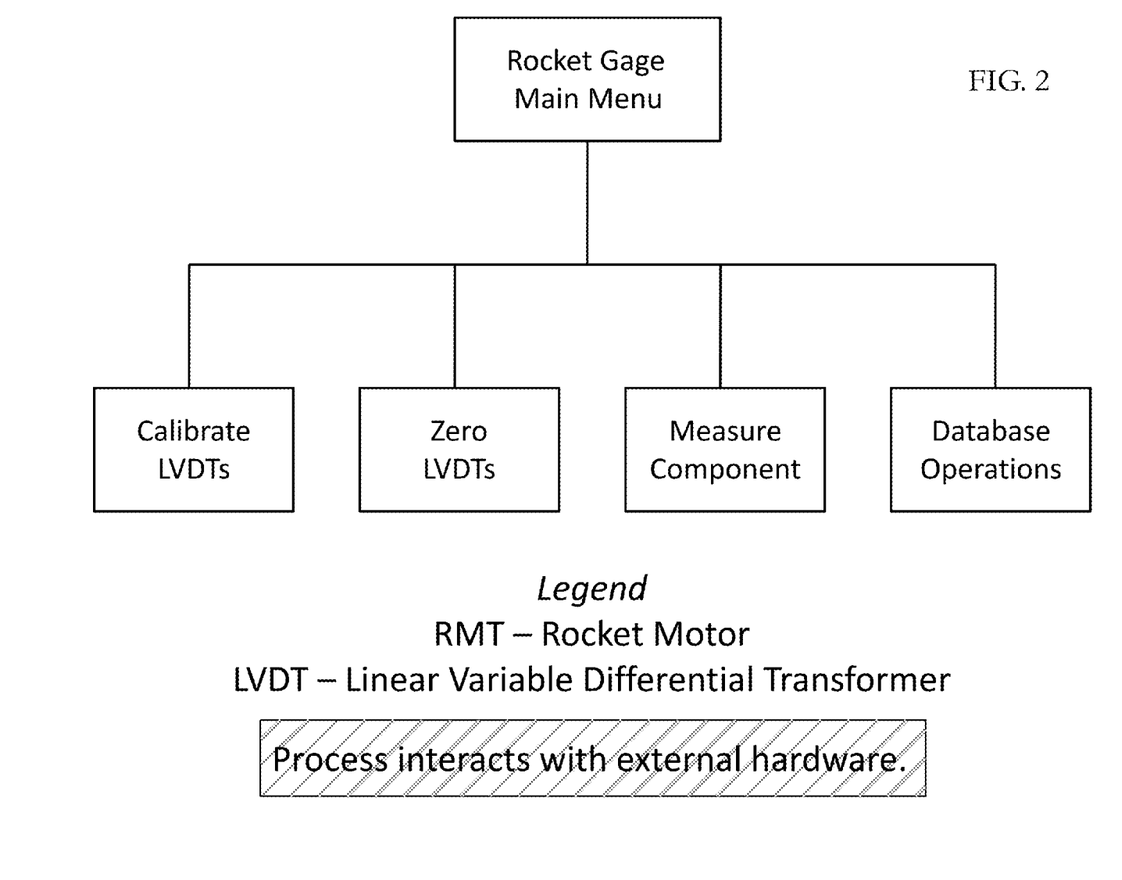
FIG. 2 is an overview of an example of an inventive computer algorithm.

Referring now to FIG. 1, inventive measurement system 1000 includes a personal computer (PC) 100, plural linear variable differential transformers (LVDTs) 200, a conditioning card 300, a terminal block 400, and a ribbon cable 500. Computer 100 has inventive software 101 resident in its memory, and communicates with LVDTs 200. The communication between computer 100 and LVDTs 200 is facilitated using conditioning card 300, terminal block 400, and ribbon cable 500. Inventive measurement system 1000 performs measurements of cylindrical tube (CT) 99.

According to many inventive embodiments, the hardware and firmware items interfacing with computer 100 are commercial off-the-shelf items. An LVDT is a known kind of sensing device, and a number of LVDT sensor (e.g., transducer) products are commercially available that may be suitable for inventive practice. An LVDT converts linear position or motion to a proportional electrical output voltage.

Conditioning card 300 can be a standard commercial-off-the-shelf LVDT conditioning card that conditions the LVDT 200 signal for the computer 100. An example of a commercially available conditioning card 300 that may be suitable for inventive practice is the Validyne USB2250 model, manufactured by Validyne Engineering, Northridge, Calif. The Validyne USB2250 is a sensor interface that provides direct sensor input to a computer (e.g., personal computer or PC) via a USB port, and that includes conditioning capability and data acquisition software.

Reference now being made to FIGS. 2 through 6, the computer 100 executes the inventive algorithm 101. Computer 100 displays raw voltage values from the LVDTs 200, so that the practitioner can input the results into computer 100. Each LVDT 200 provides a minimum voltage value and a maximum voltage value. The practitioner also inputs known measured values from a gage head or gage blocks 400, attached to the LVDTs 200. Computer 100 calculates the linear slope values for each LVDT 200; these linear slope values are used to convert all measured LVDT voltage values into inches. All calculated LVDT linear slope values are saved to a database (e.g., an encrypted database) on computer 100, which displays the readings of all LVDT measurements in inches and volts to the practitioner.

Figure 3:
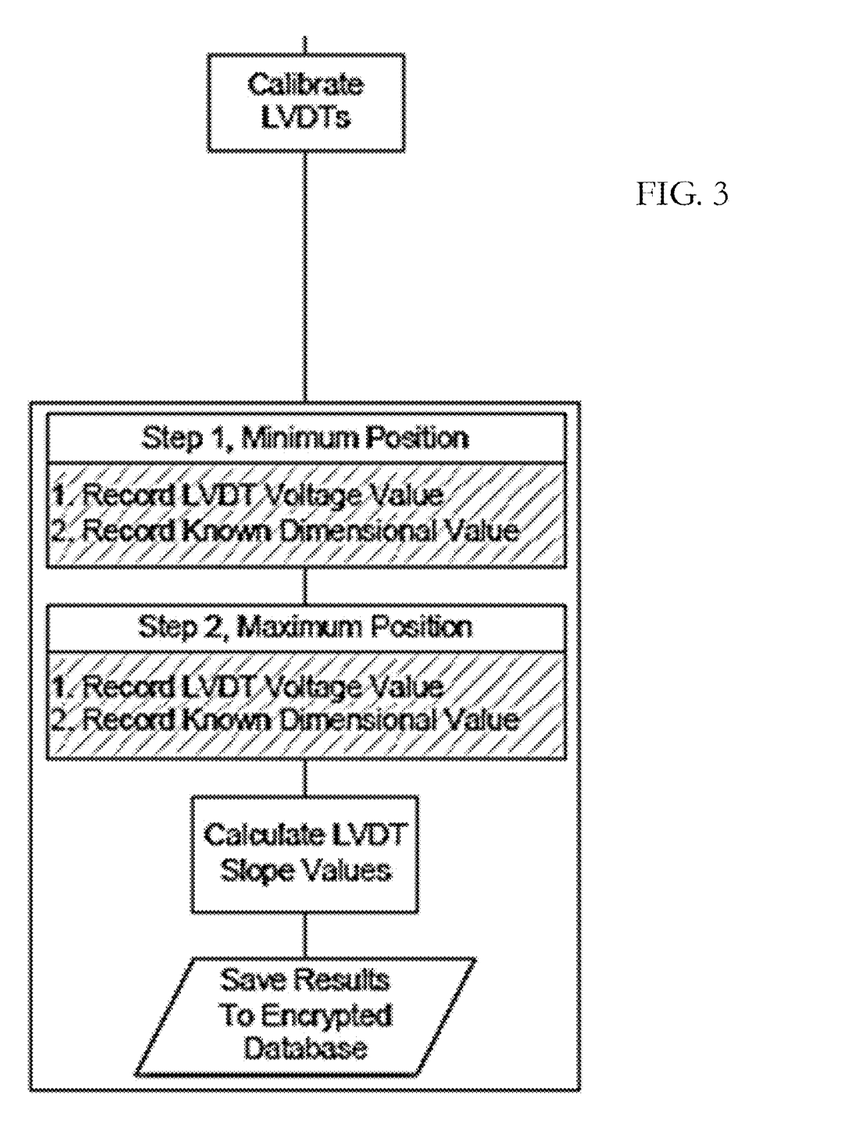
FIGS. 3 through 6 represent detailed portions of FIG. 2.

Referring to FIG. 3, in order to relate voltage changes to numerical measurement, each linear variable differential transformer (LVDT) needs to be linearized with slope values. To this end, a voltage measurement is taken at a known dimensional location, and then a second voltage measurement is taken at another known dimensional location. The two measured voltage values and the two known locational (dimensional) values are then used to calculate the linear slope value. This slope value provides the exact linear dimensional value of the location of the LVDT probe, and can be applied to any voltage value measured by the LVDT. Each LVDT has its own unique linear slope value associated therewith.

Figure 4:
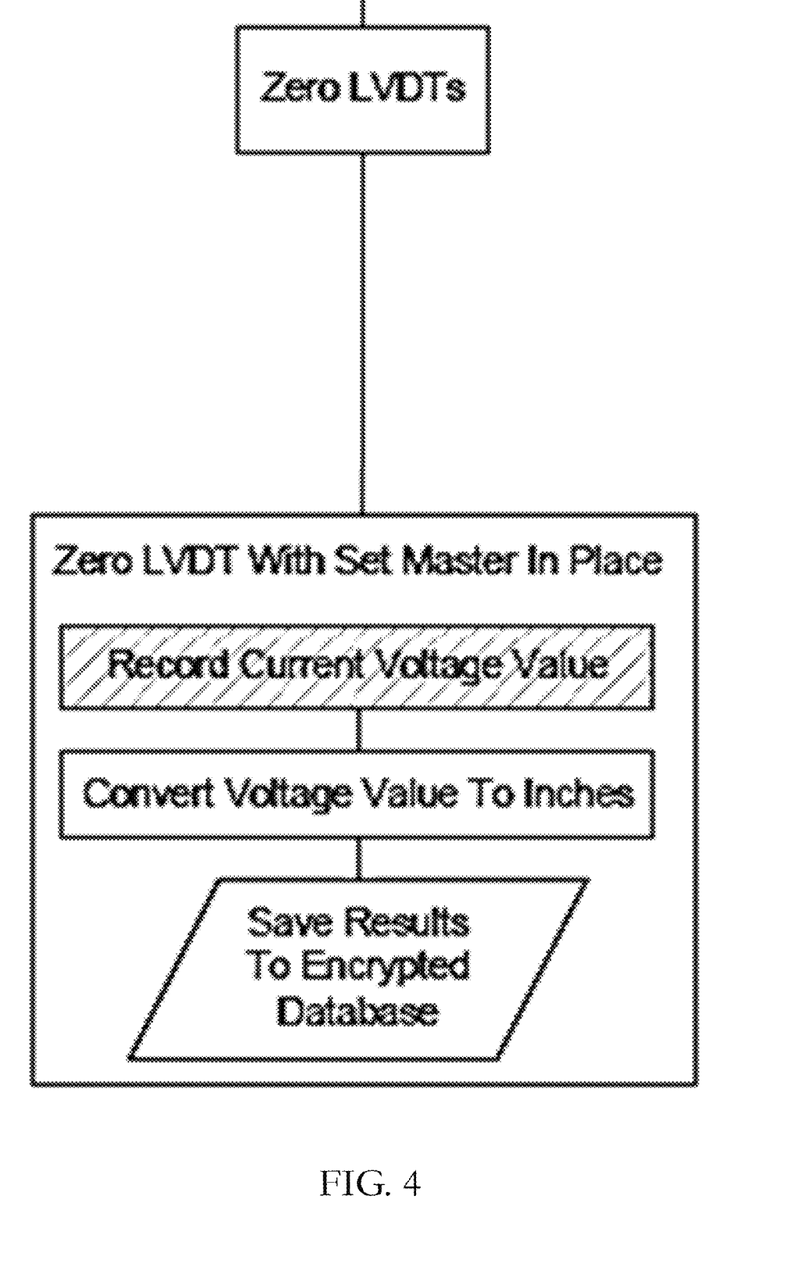

With reference to FIG. 4, using an external "set master" (not shown), the inventive algorithm 101 is capable of calculating and setting a value of zero inches for an LVDT 200 along a datum axis line. A set master is a piece of calibrated hardware that provides a known dimensional location used for calibrating measuring equipment. The set master provides a known location or dimension value that can then be related back to the measuring equipment.

With the aid of the set master, a value of zero inches is calculated and set for each LVDT 200 along a datum axis line x. After determining the linear slope value, a numerical value is added to or subtracted from the measured value. This addition/subtraction operation provides the exact linear dimensional value of where the LVDT probe 200 is located in relation to a known location of a three-dimensional (xyz) coordinate system. The location of LVDT 200 is thus determined, with use of a set master, in order that the LVDT 200 measurement can establish a home location (or zero point) along a linear axis x.

Computer 100 calculates linear measurement values based on the linear slope values that computer 100 calculated from the signals obtained by computer 100 from LVDTs 200. The linear measurement values are used to measure the cylindrical tube 99 in selected respects. The linear measurement values may be represented, for instance, in inches or millimeters or centimeters. Inventive practice of linear measurement can involve English (e.g., inches) or metric (e.g., millimeters or centimeters) or practically any other system of linear measurement.

Figure 5:
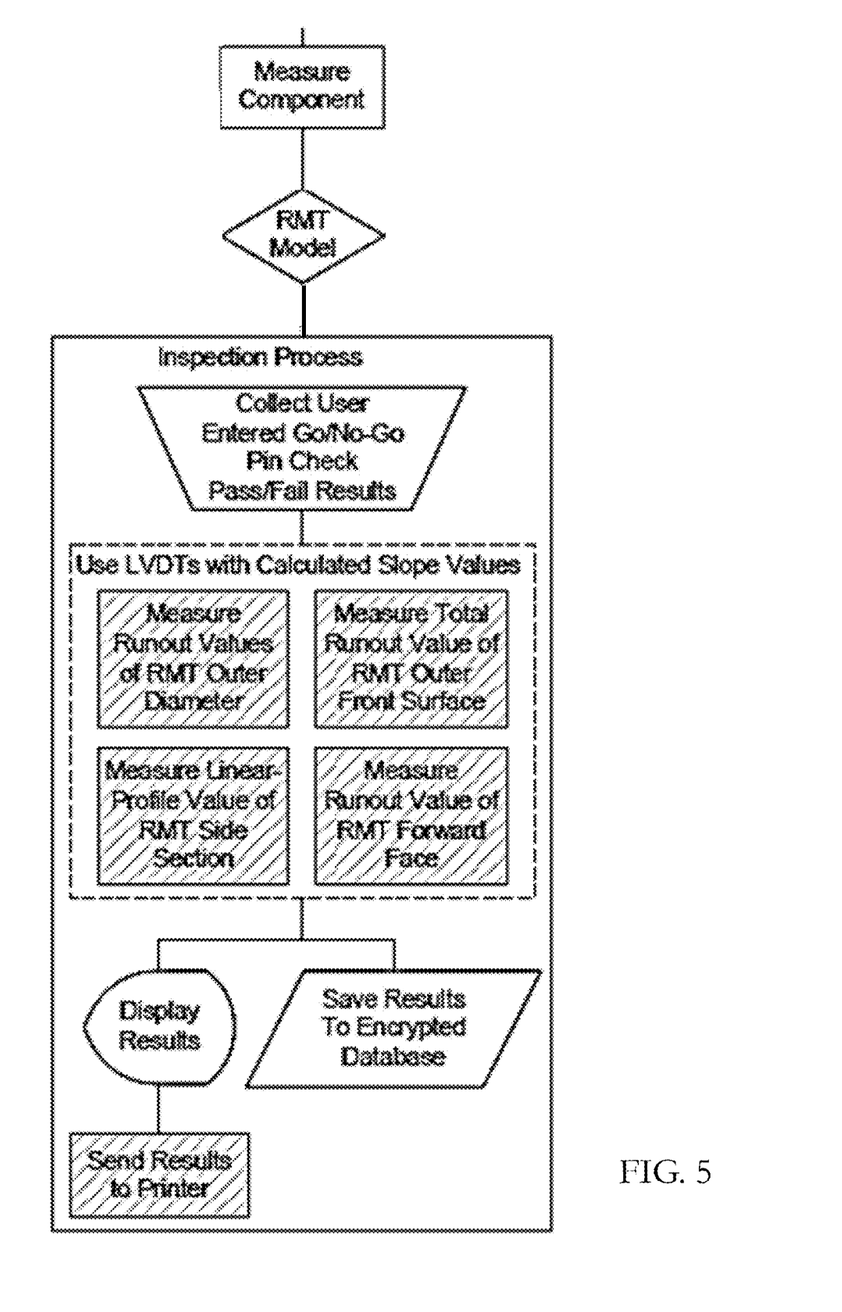

Referring to FIG. 5, inventive measurement system 1000 (i.e., computer 100 and external hardware including LVDTs 200, conditioning card 300, terminal block 400, and ribbon cable 500) performs measurement operations for one or more GD&T features such as "circular-runout" tolerance, "total-runout" tolerance, and/or "linear-profile" tolerance. Computer 100 executes computer program logic 101 and communicates with plural (e.g., multiple) LVDTs to measure these GD&T features of CT 99. Depending on the inventive embodiment, the computer may perform same or similar types of measurements with respect to one or plural cylindrical objects.

The term "geometric dimensioning and tolerancing" (acronym, "GD&T") refers to implementation of a set of standard symbols for defining parts and assembly features and their tolerance zones in dimensioning engineering drawings. In addition, GD&T may define a part based on how it functions. GD&T facilitates understanding of design intent by providing better tools for describing the drawings. ASME Y14.5M-1994 is a currently accepted authority for geometric dimensioning and tolerancing standards.

GD&T runout tolerance is a geometric tolerance that controls the form, orientation, and location of a cylindrical part, or one or more portions thereof, as it rotates about its longitudinal axis. Circular runout is a runout with respect to one or more cross-sections of a cylindrical part as it rotates. Total runout is a runout with respect to the entire length of a cylindrical part as it rotates. Runout tolerance controls the relationship of one or more features of a part to a datum axis x during a full 360 degree rotation about the datum axis. GD&T profile tolerance defines a uniform boundary around a surface within which the elements of the surface must lie. GD&T linear-profile tolerance is a uniform two-dimensional zone limited by two parallel zone-lines extending along the length of a feature.

As shown in FIG. 1, cylindrical tube 99 is characterized by a rotational longitudinal axis x, and by rotatability in clockwise and/or counterclockwise direction r about axis x. In order to perform runout measurements with respect to various points on the surface of CT 99, the inventive practitioner rotates CT 99 about its axis x in order that an LVDT 200 (e.g., the same LVDT 200 or different LVDTs 200) measure distance from LVDT 200 to CT 99 at the various points. LVDTs 200 can be arranged in a variety of ways, in keeping with the measurement objectives of the inventive practitioner.

For instance, one or more LVDTS can be positioned point perpendicularly to axis x from a first direction, and one or more LVDTs can be positioned to point perpendicularly to axis x from a second direction (e.g., ninety degrees removed from the first direction). A first horizontal array of parallel LVDTs 200 can lie in the horizontal geometric plane of axis x, and a second horizontal array of parallel LVDTs 200 can lie in the vertical geometric plane of axis x. These types of LVDT arrangements can be used for effecting runout measurements and/or profile measurements. As another example, one or more LVDTs 200 can be positioned to point perpendicularly (e.g., parallel to and/or coincident with axis x) to one or both end faces of CT 99.

The rotation of CT 99 can be accomplished for instance using a rotational housing such as securement-and-rotatability device 600 (diagrammatically shown in FIG. 1), which mechanically fixes CT 99 along its axis x so as to enable manual or mechanical or electromechanical rotation of CT 99 about its axis x. Securement-and-rotatability device 600 can be, for instance, a mandrel, spindle, arbor, or other device that holds CT 99 in place along its axis x while rotating CT 99, or permitting CT 99 to be rotated, in rotational direction(s) r.

Figure 6:
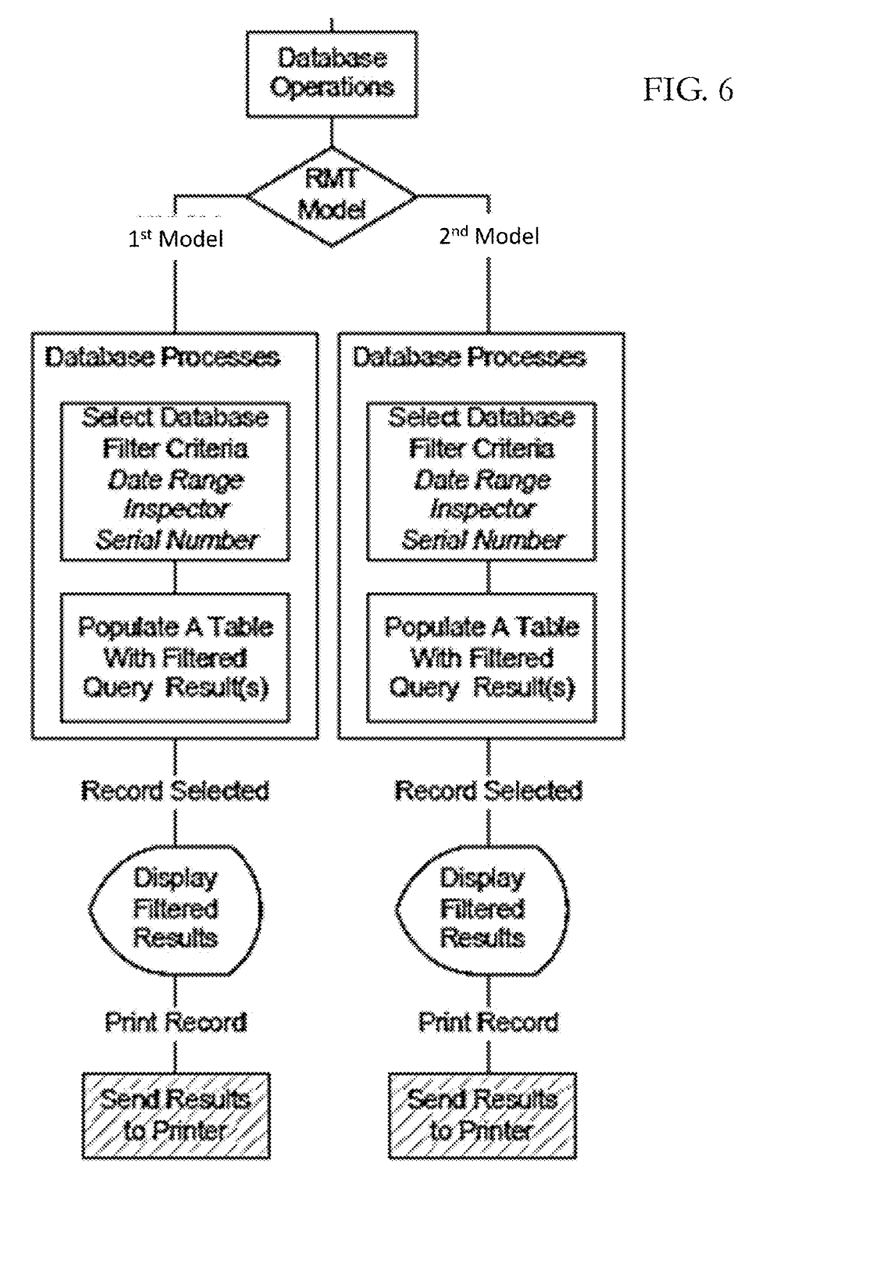

With reference to FIG. 6, executable algorithmic program 101 and the measured values taken from the LVDTs 200 are used by computer 100 to determine if the measurements fall within the acceptable dimensional boundaries specified by the CT component drawing(s). Computer 100 can save the results (e.g., measured values and tolerance determinations) to a database (e.g., an encrypted database), display them on a monitor connected to computer 100, and send them to a printer connected to computer 100.

For example, to evaluate runout tolerance, computer 100 communicates with each LVDT 200 used to measure GD&T runout on a surface of CT 99. Inventive software 101 measures and calculates the physical distance of the CT surface from the centerline of the axis of the CT. Inventive software 101 then compares the measured runout values to the dimensional requirements of the CT 99 and the GD&T runout tolerance.

As another example, to evaluate linear-profile tolerance, computer 100 communicates with each LVDT 200 used to measure GD&T linear-profile tolerance on a surface of CT 99. The inventive software 101 measures a linear path along the surface of the CT 99 and calculates how much it varies from the established axis. The measured values must fall within the two designated parallel zone-lines to be considered acceptable.

In accordance with exemplary computer logic of inventive software 101, a pass-or-fail result is determined for each item measured. Each measurement is compared to the drawing dimensional requirements. If the measured result falls within the allowable dimensional requirements, a "Pass" value is given. If the measured result does not meet the dimensional requirements, a "Fail" value is given. The pass-or-fail result for each measured item is presented by computer 100 to the inventive practitioner.

FIGS. 2 through 6 show an example of engineering tolerance evaluation of a cylindrical tube 99 in accordance with the present invention. FIGS. 3 and 4 describe actions taken to calibrate (FIG. 2) and zero (FIG. 3) an individual LVDT 200; these actions are taken for each LVDT 200 in inventive system 1000. FIGS. 5 and 6 describe actions taken, using LVDTs 200 and cylindrical tube inspection software 101, to measure and process GD&T values for an individual CT 99; these actions are taken for each CT 99 that is associated with inventive system 1000 in order to be evaluated with respect to one or more aspects of engineering tolerancing. Note that, as illustrated by way of columnar repetition in FIG. 6, the measuring and processing operations shown in FIGS. 5 and 6 can be performed for each of plural CTs 99.

Figure 7:
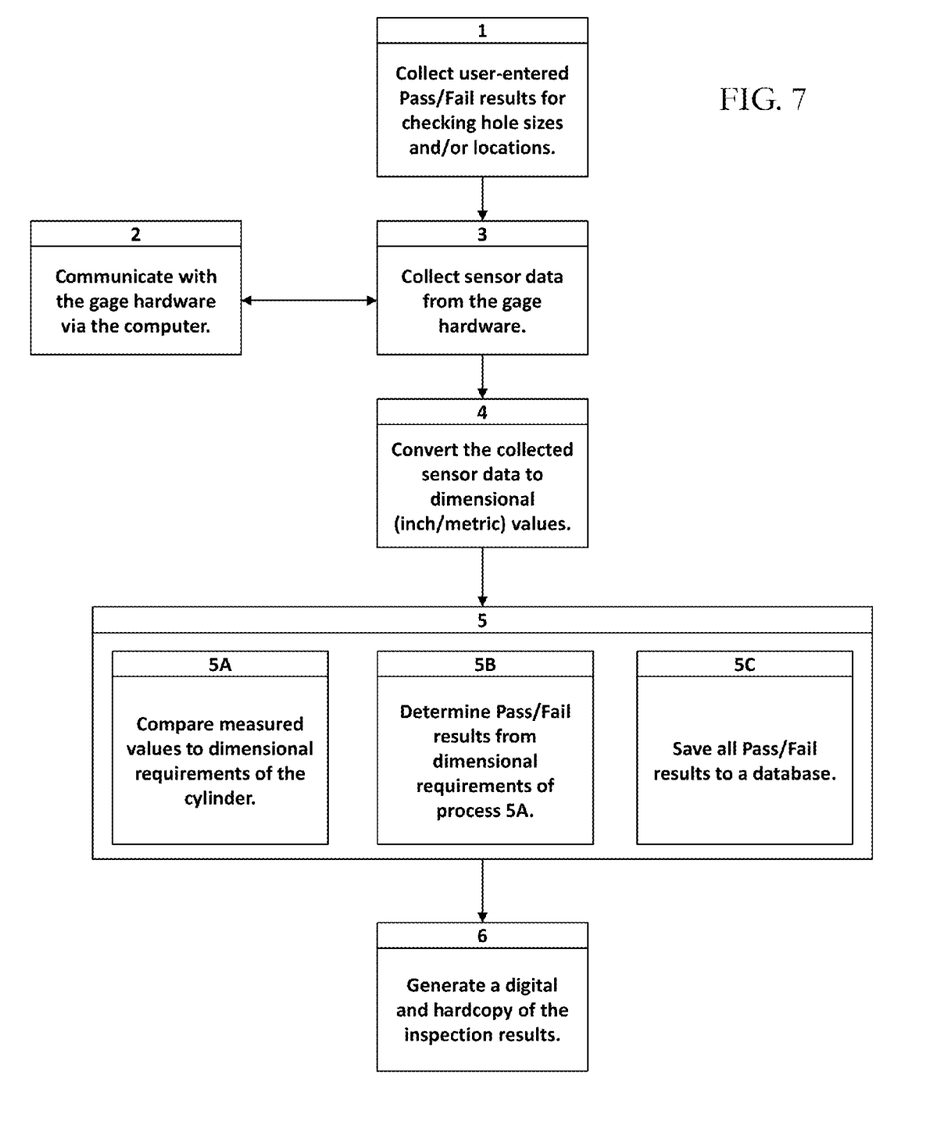
FIG. 7 is a flowchart of exemplary methodology for performing dimensional measurement of a cylindrical object in accordance with the present invention.

Reference is now made to FIG. 7, which is a flowchart showing the unique process-logic functions and attributes of exemplary inventive practice implementing LVDTs 200 and inventive software 101, such as shown in FIGS. 2 through 6. The inventive practitioner performs a series of manual Go/No-Go fit checks. The inventive software collects the user-entered "Pass" or "Fail" results for the manually performed fit checks. Note the possibility that a machine part passes all LVDT checks performed in accordance with inventive practice, yet fails the overall inspection. For instance, if a pin does not actually fit where it is supposed to fit, the part is rejected. Geometric accuracy is needed of both size and location. (Block "1")

The inventive software communicates with the gage hardware, e.g., LVDTs and other electromechanical devices. (Block "2") The inventive software collects sensor data from the gage measuring devices, e.g., the LVDTs 200. According to exemplary inventive embodiments such as shown in FIG. 1, the inventive software collects data from the LVDTs 200 with the aid of a conditioning card 300. (Block "3")

The inventive software converts the electromagnetic pulses received from the LVDTs to language that the computer can understand; in particular, the collected data is converted into dimensional values by the inventive software. The linear measurements can be described according to either the English measurement system (e.g., in inches or feet) or the metric measurement system (e.g., in millimeters, centimeters, or meters), according to the preference of the inventive practitioner. (Block "4")

The inventive software then processes the readings (Block "5," which includes Blocks "5A," "5B," and "5C"). The inventive software compares the measured dimensional data to dimensional requirements of the cylindrical tube. (Block "5A") Based on the comparison of measured dimensional data versus dimensional requirements, the inventive software determines the "Pass" or "Fail" result for each feature or item being measured. (Block "5B") All of the measured values per Block "5A," and all of the Pass-or-Fail" results per Block "5B," are saved by the inventive software to a database. (Block "5C") A digital report may be generated by the inventive software, and the same report may be printed as a hardcopy. (Block "6")

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. An apparatus for evaluating dimensional tolerancing conformance of a substantially cylindrical object, said object having a circumferential surface and a longitudinal axis, the apparatus comprising:
   a rotationally facilitative device, for fixing said axis so that said object is rotatable about said axis;
   at least one sensor, each said sensor being for measuring distance from said sensor to said circumferential surface of said object;
   a computer having computer code characterized by computer program logic, said computer code being executable by said computer so that, in accordance with said computer program logic, said computer performs acts including:
inputting measurements taken by said at least one sensor with respect to said object at different rotational positions of said object, each said measurement taken by a said sensor with respect to said object at a said rotational position whereby said sensor measures said distance from said sensor to said circumferential surface of said object;
establishing at least one tolerance standard; and
based on said measurements and said at least one tolerance standard, deciding whether said object passes tolerancing or fails tolerancing, wherein said object passes tolerancing if said object completely conforms with said at least one tolerance standard, and wherein said object fails tolerancing if said object does not completely conform with said at least one runout tolerance standard.

2. The apparatus of claim 1 further comprising a set master for zeroing each said sensor prior to said taking of said runout measurements.

3. The apparatus of claim 1 wherein according to said inputting of said measurements said computer receives signals indicative of said measurements, and wherein the apparatus further comprises a device for conditioning said signals prior to said receipt of said signals by said computer.

4. The apparatus of claim 1 wherein each said sensor measures said distance in a direction perpendicular to said axis.

5. The apparatus of claim 1 wherein each said sensor is a linear variable differential transformer.

6. The apparatus of claim 1 wherein:
said measurements taken by said at least one sensor are runout measurements;
said at least one tolerance standard is at least one runout tolerance standard;
said tolerancing is runout tolerancing.

7. A computer program product for evaluating compliance, with dimensional tolerancing, of an object having a cylindrical surface and a rotational axis, the computer program product comprising a non-transitory computer-readable storage medium having computer-readable program code portions stored therein for execution by a computer, the computer-readable program code portions including:
a first executable program code portion, for processing signals received from at least one sensor, said signals indicating at least one distance sensed by said at least one sensor with respect to said cylindrical surface of said object for at least one rotational position of said object, said processing including converting said signals to linear measurement values;
a second executable program code portion, for prescribing at least one tolerance standard;
a third executable program code portion, for deciding whether said object passes tolerancing or fails tolerancing, said decision including consideration of said linear measurement values and said at least one tolerance standard, wherein said object passes tolerancing if said object completely conforms with said at least one tolerance standard, and wherein said object fails tolerancing if said object does not completely conform with said at least one tolerance standard.

8. The computer program product of claim 7 wherein the computer-readable program code portions include a fourth executable program code portion, for processing signals received from said at least one sensor that pertain to calibration of said at least one sensor.

9. The computer program product of claim 7 wherein each said sensor is a linear variable differential transformer.

10. The computer program product of claim 9 wherein:
said measurements are runout measurements taken by said at least one sensor with respect to said object at at least two different rotational positions of said object;
said at least one tolerance standard is at least one runout tolerance standard;
said tolerancing is runout tolerancing.

11. The computer program product of claim 10 wherein each said linear variable differential transformer measures said distance in a direction perpendicular to said axis.

* * * * *